United States Patent
Bedrignans et al.

(10) Patent No.: US 11,396,914 B2
(45) Date of Patent: Jul. 26, 2022

(54) FILTERING DEVICE FOR DAMPING VIBRATIONS IN A CONDUIT OF A HYDRAULIC ACTUATION SYSTEM FOR DISENGAGING A CLUTCH

(71) Applicant: RAICAM DRIVELINE S.R.L., Mondovì (IT)

(72) Inventors: Jean Baptiste Bedrignans, Mondovì (IT); Francesca Botto, Mondovì (IT)

(73) Assignee: RAICAM DRIVELINE S.R.L., Mondovi (IT)

( * ) Notice: Subject to any disclaimer, the term of this patent is extended or adjusted under 35 U.S.C. 154(b) by 118 days.

(21) Appl. No.: 17/002,326

(22) Filed: Aug. 25, 2020

(65) Prior Publication Data
US 2021/0062873 A1 Mar. 4, 2021

(30) Foreign Application Priority Data
Aug. 26, 2019 (IT) .............................. 2019000015012

(51) Int. Cl.
*F16D 48/02* (2006.01)
*F16D 25/08* (2006.01)
(Continued)

(52) U.S. Cl.
CPC ............ *F16D 48/02* (2013.01); *F16D 25/08* (2013.01); *F16D 25/12* (2013.01);
(Continued)

(58) Field of Classification Search
None
See application file for complete search history.

(56) References Cited

U.S. PATENT DOCUMENTS 4,998,609 A * 3/1991 Nix ..................... F16D 25/12
192/109 F
5,479,779 A * 1/1996 Havdal ................. F16D 25/088
60/591

(Continued)

FOREIGN PATENT DOCUMENTS

| EP | 2193282 B1 | 6/2012 |
| JP | S6240334 U | 3/1987 |
| KR | 100793890 B1 | 1/2008 |

OTHER PUBLICATIONS

Italian Search Report and Written Opinion for IT Patent Application No. 201900015012, dated May 6, 2020, 8 pages.

*Primary Examiner* — Timothy Hannon
(74) *Attorney, Agent, or Firm* — Armstrong Teasdale LLP

(57) ABSTRACT

A filtering device includes a tubular outer body with an intermediate chamber containing a pair of cup-shaped valve elements mounted floating and slidable coaxially with opposing cavities in which an axially compressed spring is housed. The first cup-shaped valve element is arranged coaxially outside the second cup-shaped valve element and has a base with a central through opening and a tubular portion with a series of ribs. The second cup-shaped valve element has a perforated base abutting against a perforated plug fixed to one side of the cavity passing towards the master cylinder. The perforated plug forms a through seat that slidably houses an appendage of the second cup-shaped valve element. Passages are formed around the plug that establish fluid communication between the intermediate chamber and a passage to the master cylinder.

6 Claims, 4 Drawing Sheets

(51) Int. Cl.
*F16D 25/12* (2006.01)
*F16D 121/04* (2012.01)
(52) U.S. Cl.
CPC ............ *F16D 2025/081* (2013.01); *F16D 2048/0215* (2013.01); *F16D 2048/0221* (2013.01); *F16D 2121/04* (2013.01); *F16D 2300/22* (2013.01)

(56) References Cited

U.S. PATENT DOCUMENTS

| | | | | |
|---|---|---|---|---|
| 6,116,399 | A * | 9/2000 | Drexl | F16D 25/08 192/109 F |
| 6,405,845 | B1 * | 6/2002 | Muller | F16D 48/02 192/30 V |
| 2001/0020415 | A1 | 9/2001 | Osterlanger et al. | |

* cited by examiner

FILTERING DEVICE FOR DAMPING VIBRATIONS IN A CONDUIT OF A HYDRAULIC ACTUATION SYSTEM FOR DISENGAGING A CLUTCH

CROSS-REFERENCE TO RELATED APPLICATION

This application claims priority to and benefit of Italian Patent Application No. 102019000015012 filed Aug. 26, 2019, the contents of which are incorporated by reference in their entirety.

FIELD OF THE INVENTION

The present invention relates to a filtering device for damping vibrations, typically at low frequency, in a pressurized conduit of a hydraulic actuation system for disengaging a clutch. The filtering device is suitable to be applied in a pressurized conduit portion located between a master cylinder and a slave cylinder in the clutch disengagement system.

BACKGROUND OF THE INVENTION

While driving, it may happen that the driver keeps his foot on the clutch disengagement pedal even when the pedal is not operated. In such cases, in the absence of a filtering device, the driver may experience an annoying tingling sensation in his foot, due to close pressure waves or pulses that are transmitted as vibrations to the clutch pedal through the liquid in the pressurized conduit. The vibrations originate from the motor, which transmits them to the flywheel of the clutch.

The function of the filtering devices of the aforesaid type is to dampen the axial vibrations which, in the pressurized fluid, tend to rise up the conduit and reach the clutch control pedal in the portion between said pedal and the thrust bearing which acts on the diaphragm to disengage the clutch.

EP 2193282 B1 discloses a hydraulic element having an outer body which has a hydraulic connection on the side of the master cylinder and a hydraulic connection on the side of the slave cylinder. The outer body contains a valve configuration which has two valve bodies which are mounted floating in the outer body and may be displaced relative to each other against the force of a spring. The valve assembly comprises an outer valve body and an inner valve body. The outer valve body comprises a cup-shaped valve element in which a tubular portion of the inner valve body is movably mounted. The valve body and the tubular portion each have at least one respective connection hole; the connection holes may be placed one on top of the other, depending on the relative position of the two valve bodies.

SUMMARY OF THE INVENTION

An object of the present invention is to provide an improved filtering device, having lower pressure drops and being more efficient from a hydraulic perspective. Another object of the present invention is to provide a filtering device composed of simple shape elements which are structurally robust. An easy-to-assemble filter device is also provided.

The aforesaid and other objects and advantages, which will be better understood in the following detailed description, are achieved by a filtering device having the features described and claimed herein. Preferred embodiments of the filtering device are also described.

In summary, a filtering device comprises a tubular outer body with a chamber containing a pair of cup-shaped valve elements mounted floating and slidable coaxially with opposing cavities in which an axially compressed spring is housed. The first cup-shaped valve element is arranged coaxially outside the second cup-shaped valve element and has a base with a central opening and a tubular portion with a series of ribs. The second cup-shaped valve element has a perforated base that may abut against a perforated plug fixed to one side of the through cavity towards the master cylinder. The perforated plug forms a through seat that slidably accommodates an appendage of the second cup-shaped valve element. Passages establishing fluid communication between the chamber and a passage to the master cylinder are formed about the perforated plug.

BRIEF DESCRIPTION OF THE DRAWINGS

A few preferred, non-limiting embodiments of a filtering device according to the present invention will now be described, with reference to the accompanying drawings, in which.

DETAILED DESCRIPTION

Figure 1:
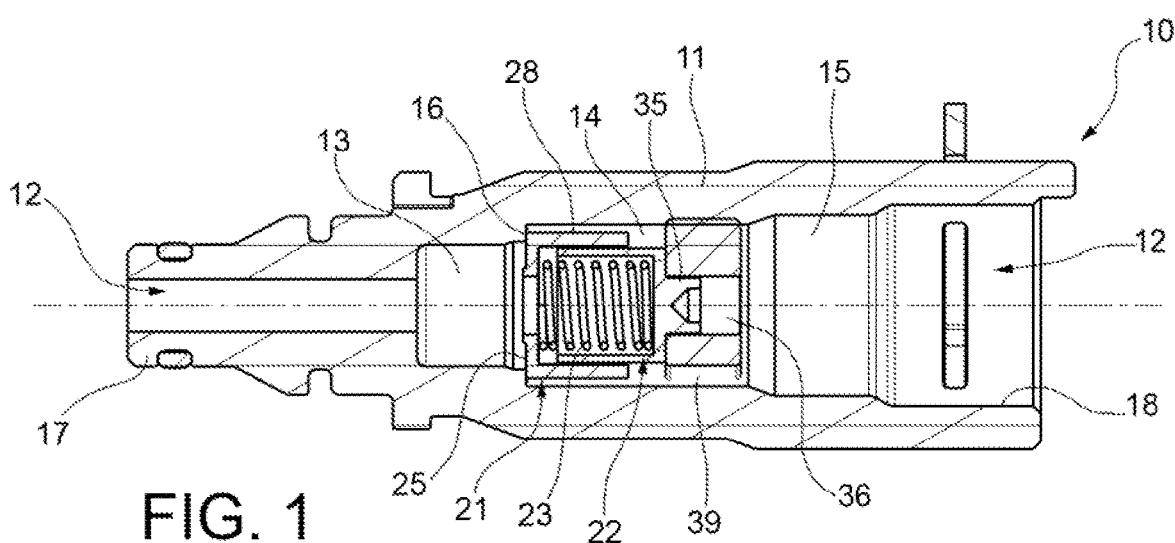
FIGS. 1, 2 and 3 are schematic views in axial section of a filtering device in three respective different operating positions.
Figure 2:
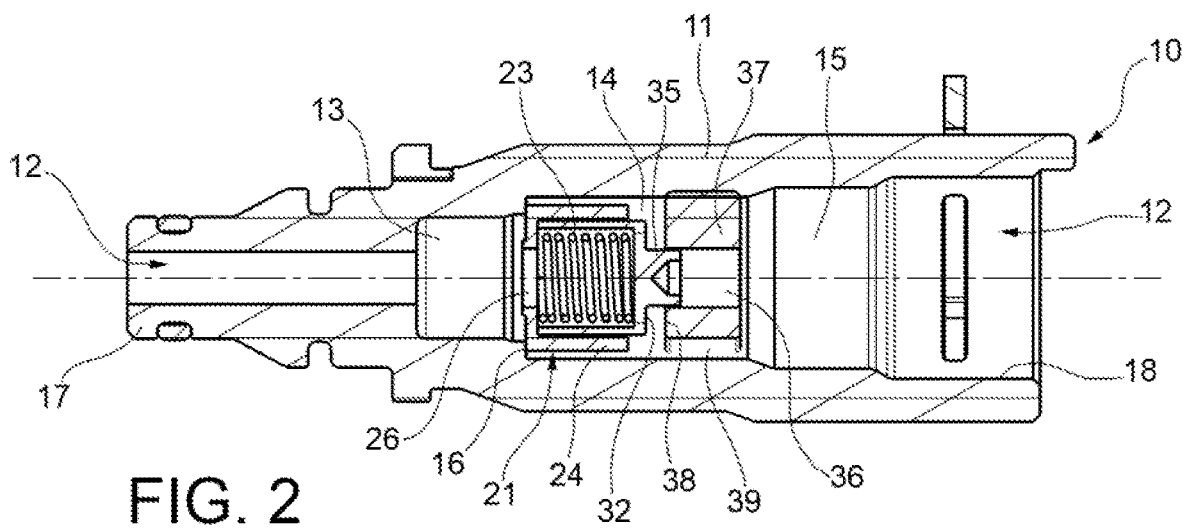
Figure 3:
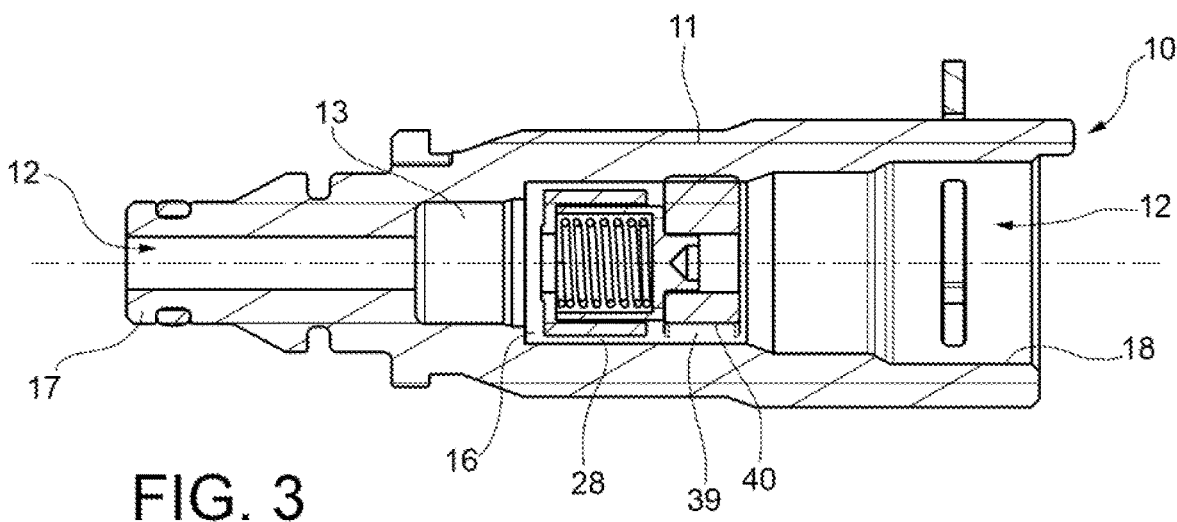
Figure 4:
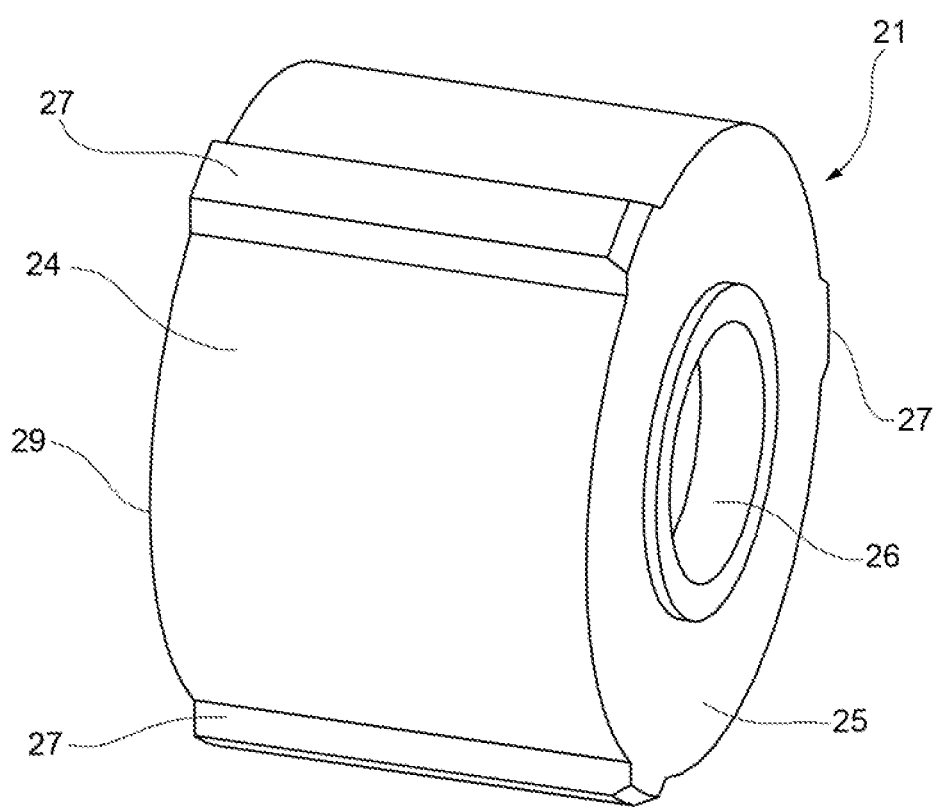
FIGS. 4 and 5 are perspective views, from two different angles, of a component of the filtering device of FIGS. 1-3.
Figure 5:
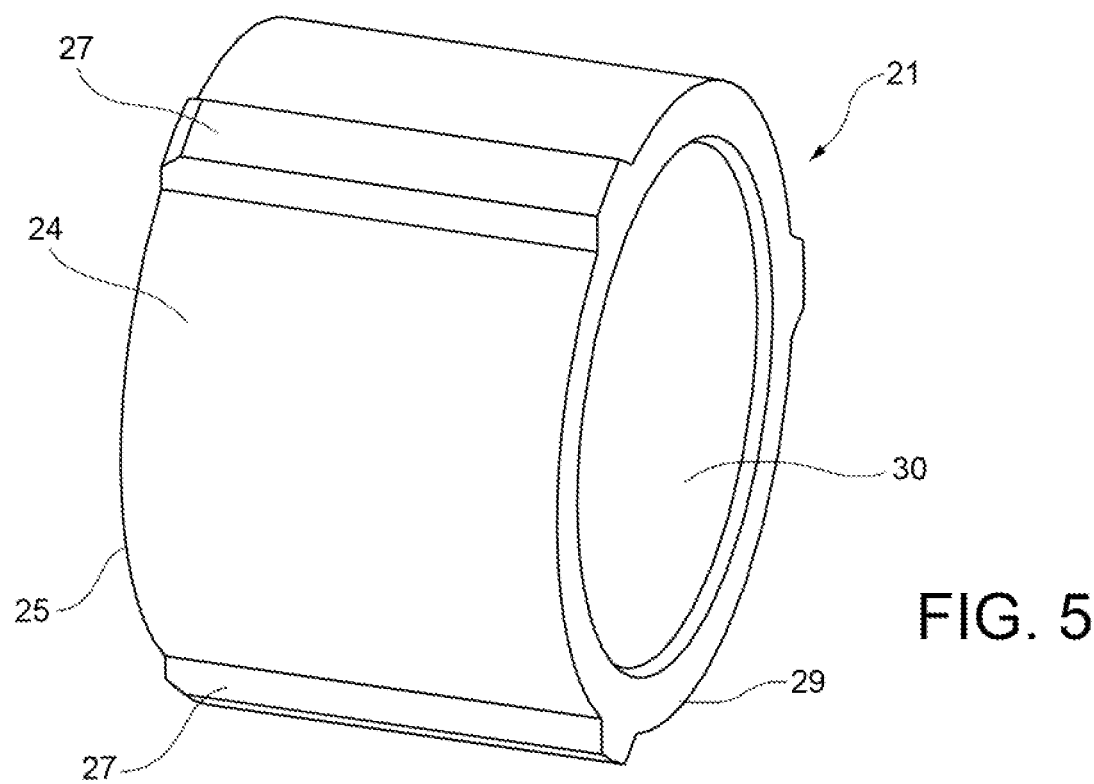
Figure 6:
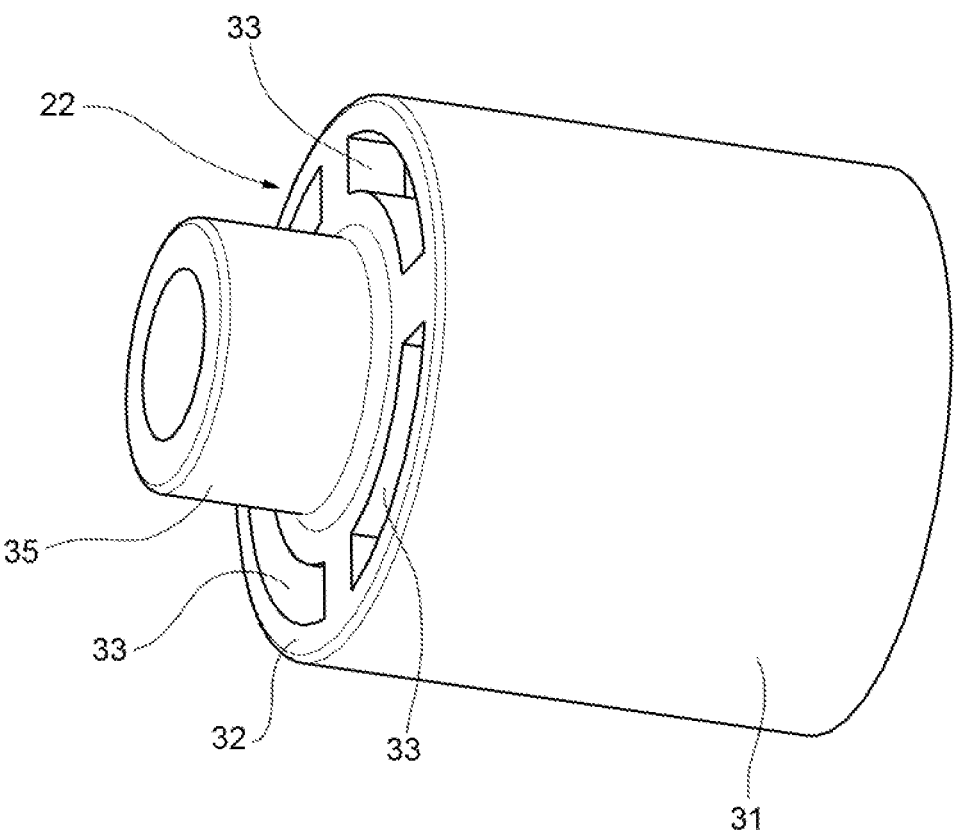
FIGS. 6 and 7 are perspective views, from two different angles, of another component of the filtering device of FIGS. 1-3.
Figure 7:
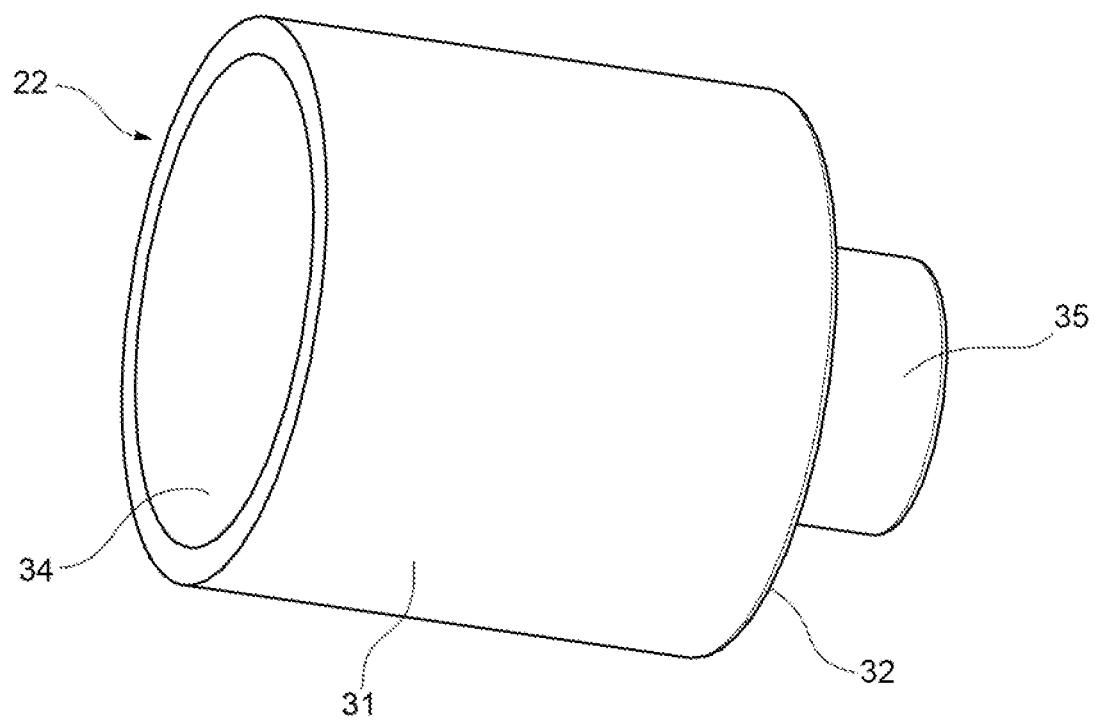
Figure 8:
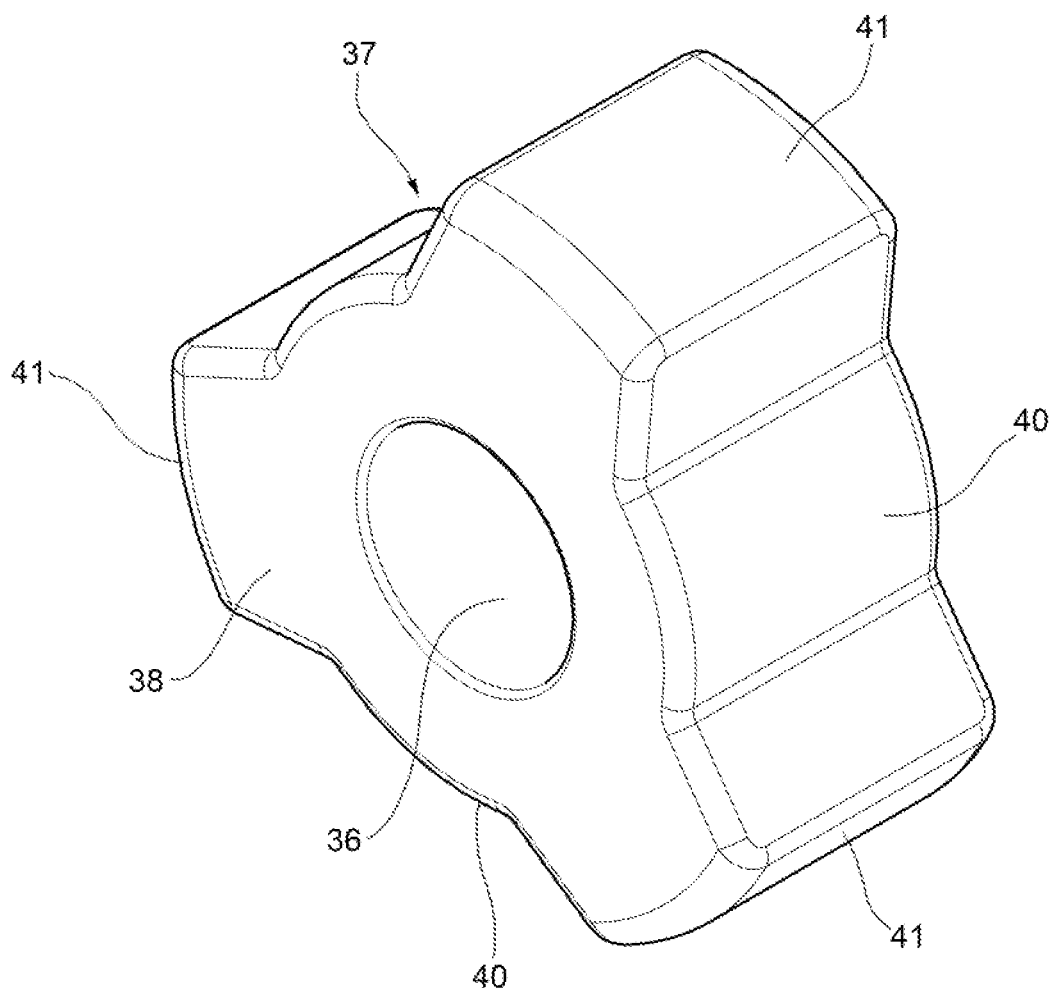
FIG. 8 is a perspective view of a further component of the filtering device of FIGS. 1-3.

Referring initially to FIGS. 1 to 3, a filtering device according to an embodiment of the present invention is indicated as a whole at reference numeral 10. The filtering device 10 comprises an outer body 11 of tubular shape and axially elongated in a direction here defined as "longitudinal," preferably rectilinear. It is to be understood that terms and expressions indicating directions and orientations, including "axial," "longitudinal," "radial" or "transversal," are to be interpreted with reference to a longitudinal actuation axis x of the filtering device.

The outer body 11 has two opposite ends, with a first hydraulic connection 17 at a first end, to be connected, in use, to a slave cylinder (not shown) and a second end with a second hydraulic connection 18 to be connected, in use, to a master cylinder (not illustrated). In the embodiment in FIGS. 1-3, the hydraulic connection 17 on the slave side is a male connection, whereas the connection 18 on the master side is a female connection.

The outer body 11 has a through cavity 12 extending longitudinally between the two opposite ends. The through cavity 12 comprises a first passage section 13 adapted to be placed, in use, on the side of the slave cylinder, an intermediate chamber 14, and a second passage section 15, adapted to be placed, in use, towards the side of the master cylinder. The through cavity 12 may have a circular cross-section.

A radial shoulder 16 is provided between the intermediate chamber 14 and the first passage section 13 on the slave side. In the embodiment of FIGS. 1-3, the first passage section 13 has a smaller diameter or transversal dimension than the diameter or transversal dimension of the intermediate chamber 14.

A valve mechanism, comprising a pair of cup-shaped valve elements 21, 22 and a spring 23, is provided inside the intermediate chamber. The cup-shaped valve elements 21, 22 are mounted floating and slidable telescopically one inside the other, with opposing cavities. The spring 23 is interposed and coaxially contained within the two cup-shaped valve elements and acts between them to exert an axial thrust tending to axially move the two cup-shaped valve elements away from each other.

The first cup-shaped valve element 21 is located in a radially outermost position and has a tubular portion 24 and a transversal or radial base 25, arranged towards the side of the slave cylinder, capable of abutting against the radial shoulder 16. A substantially central through opening 26 is formed in the transversal or radial base 25.

A plurality of ribs 27 projecting in a radially outward direction and extending in a longitudinal direction are formed on the tubular portion 24. The ribs 27 define a plurality of outer passages 28 with the outer surface of the tubular portion 24 and with the inner surface of the intermediate chamber 14. The outer passages 28 extend from the transversal or radial base 25 to the opposite free end 29 of the tubular portion 24. The outer passages 28 may be in the form of annular segments when viewed in cross section.

The first cup-shaped valve element 21 has a cavity 30, defined by the tubular portion 24 and by the transversal or radial base 25, facing the master side of the filtering device.

The second cup-shaped valve element 22 has a tubular portion 31, and a radial or transversal base 32, arranged towards the master side of the filtering device. At least one longitudinal through hole 33 is formed through the radial or transversal base 32. Preferably, a plurality of longitudinal through holes 33 are distributed in a peripheral area of the radial or transversal base 32.

The radial or transversal base 32 and the tubular portion 31 form a cavity 34 facing the slave side of the filtering device.

The tubular portion 31 of the second cup-shaped valve element 22 is coaxially housed inside the tubular portion 24 of the first cup-shaped element 21 and receives the spring 23, of helical type, in the illustrated embodiment. The opposite longitudinal ends of the spring rest, on the one side, against the base radial or transversal 32 of the second cup-shaped valve element 22 and, on the other, against the transversal or radial base 25 of the first cup-shaped valve element 21, about the central through opening 26.

A longitudinal cylindrical appendage 35 extends from the radial or transversal base 32 of the second cup-shaped valve element 22, projecting towards the master side of the filtering device, and is housed slidably and guided longitudinally by a through seat 36 formed in a plug 37 mounted axially fixed in the through cavity 12 of the outer body 11, in this example in the intermediate chamber 14.

On the side facing the valve mechanism, the plug 37 has a flat radial or transversal surface 38, suitable to occlude the longitudinal through holes 33 formed through the radial or transversal base 32 of the second valve element 22.

The plug 37 has an outer surface shaped to define one or more outer longitudinal passages 39 between the environment containing the valve mechanism (in this case the intermediate chamber) and the hydraulic connection on the side of the master cylinder. In the illustrated embodiment, the plug 37 has a series of peripheral cavities 40 extending longitudinally, interspersed with radial projections 41 sealed against the inner cylindrical surface of the through cavity 12 of the outer body.

The operation of the filtering device 10 is as follows. FIG. 1 shows a static condition in which the master cylinder is not actuated and the clutch is in an engaged condition. In the static condition, the two cup-shaped valve elements 21, 22 are pushed by the spring 23 in abutment against the radial shoulder 16 of the outer body 11 and against the plug 37 respectively. The abutment of the second cup-shaped valve element 22 against the plug 37 occludes the longitudinal through holes 33. The abutment of the first cup-shaped valve element 21 against the radial shoulder prevents the fluid present in the first passage section of the conduit 13 from reaching the outer passages 28 and 39 obtained in the periphery of the first cup-shaped valve element 21 and of the plug 37. Therefore, there is no fluid communication between the sections of the hydraulic actuation circuit upstream and downstream of the filtering device 10. Possible vibrations or pressure waves in the section of the circuit between the master cylinder and the filtering device 10 cannot be transmitted to the slave cylinder and therefore cannot reach the control pedal and the driver's foot.

The arrangement illustrated in FIG. 2 corresponds to the clutch disengagement condition, in which the pedal is pressed by the driver to allow the gear change. In this condition, the hydraulic fluid is pushed from the master cylinder towards the slave cylinder. When the pressure of the fluid coming from the side of the master cylinder and acting against the longitudinal cylindrical appendage 35 is such as to create an axial thrust greater than the elastic force exerted by the spring 23, the second cup-shaped valve element 22 moves axially towards the slave side, detaching itself from the plug 37. The fluid enters through the longitudinal through holes 33, penetrates the cavity 34 of the second cup-shaped valve element 22 and, through the central through opening 26 in the transversal or radial base 25 of the first cup-shaped valve element 21, passes into the first passage section 13 and flows towards the slave cylinder.

FIG. 3 illustrates the arrangement that occurs in the step of the fluid returning to the master cylinder, when the driver releases the clutch control pedal. In this condition, the pressure of the hydraulic fluid from the side of the slave cylinder is such to create an axial thrust greater than the elastic force exerted by the spring 23. The first cup-shaped valve element 21 moves axially towards the master side, detaching itself from the radial shoulder 16. The fluid passes from the first passage section 13 into the intermediate chamber 14, through the outer passages 28 and 39 about the first cup-shaped valve element 21 and the plug 37, without passing through the second cup-shaped valve element 22, and flows towards the master cylinder.

As will be appreciated, the filtering device provides a very linear flow path, with consequently lower pressure drops. The geometric shape of the valve elements is constructively simple and easy to assemble, since it does not require any related angular orientation between the two cup-shaped valve elements, which may be angularly symmetrical. The thrust surfaces on which the hydraulic fluid acts are made of parts of the valve elements which are oriented in a radial direction to better exploit the hydraulic thrust.

Various aspects and embodiments of the filtering device have been disclosed. It is to be understood that each embodiment may be combined with any other embodiment. Moreover, the embodiments and the details of construction may be varied with respect to those described and illustrated purely by way of non-limiting example, without thereby departing from the scope of protection as described and claimed herein.

What is claimed is:

1. A filtering device for damping vibrations in a conduit between a master cylinder and a slave cylinder of a hydraulic actuation system for disengaging a clutch, the filtering device comprising:
   an outer body comprising a through cavity extending longitudinally between two opposite ends, the through cavity having:
      a first passage section to be placed, in use, towards the slave cylinder,
      an intermediate chamber,
      a second passage section to be placed, in use, towards the master cylinder, and
      a radial shoulder between the intermediate chamber and the first passage section;
   a valve mechanism comprising a first valve element and a second valve element mounted telescopically floating in the intermediate chamber, and a spring axially compressed between the first and second valve elements,
   wherein the first valve element is a cup-shaped element mounted in the intermediate chamber in a radially outermost position and comprises an axially extended tubular portion, a transversal base arranged towards a side of the slave cylinder and capable of coming into abutment against the radial shoulder, and a substantially central through opening formed in the transversal base;
   wherein:
      the second valve element is a cup-shaped element comprising:
         a tubular portion mounted coaxially inside the axially extended tubular portion of the first valve element,
         a transversal base, arranged towards the master cylinder side of the filtering device,
         at least one longitudinal through hole formed through the transversal base, and
         an appendage longitudinally protruding from the transversal base towards the master cylinder side;
      a plug is fixed in the through cavity between the intermediate chamber and the second passage section, the plug forming:
         a longitudinally extending through seat that longitudinally accommodates the appendage of the second valve element,
         a transversal surface constituting a stop for the transversal base of the second valve element, and
         at least one outer longitudinal passage establishing a fluid communication between the intermediate chamber and the second passage section,
      and at least one outer passage extends longitudinally outside the axially extended tubular portion between two opposite longitudinal ends of the axially extended tubular portion.

2. The filtering device of claim 1, wherein the spring is interposed and contained coaxially inside the tubular portion of the second valve element.

3. The filtering device of claim 1, wherein a plurality of longitudinal through holes distributed in a peripheral area of the transversal base is formed through the transversal base of the second valve element.

4. The filtering device of claim 1, wherein the axially extended tubular portion of the first cup-shaped valve element forms a plurality of ribs projecting in a radially outer direction and extending in a longitudinal direction, wherein the plurality of ribs defines a plurality of outer passages with an outer surface of the axially extended tubular portion and with the intermediate chamber.

5. The filtering device of claim 1, wherein the plug has an outer surface shaped to determine a plurality of outer longitudinal passages that establish a fluid communication between the intermediate chamber and the second passage section.

6. The filtering device of claim 1, wherein the first and second valve elements form respective opposite cavities and the spring is contained radially in the cavity of the second valve element and two opposite axial ends of the spring act respectively against the transversal base of the first valve element and against the transversal base of the second valve element.

* * * * *